United States Patent [19]
Richtsmeier et al.

[11] Patent Number: 5,376,958
[45] Date of Patent: Dec. 27, 1994

[54] STAGGERED PENS IN COLOR THERMAL INK-JET PRINTER

[75] Inventors: Brent W. Richtsmeier; Alpha N. Doan, both of San Diego, Calif.; Mark S. Hickman, Vancouver, Wash.

[73] Assignee: Hewlett-Packard Company, Palo Alto, Calif.

[21] Appl. No.: 877,905

[22] Filed: May 1, 1992

[51] Int. Cl.5 .............................. B41J 2/145
[52] U.S. Cl. .......................... 347/40; 347/43
[58] Field of Search .......... 346/25, 140 R, 75

[56] References Cited

U.S. PATENT DOCUMENTS

| | | | |
|---|---|---|---|
| 4,528,576 | 7/1985 | Koumura et al. | 346/140 R |
| 4,540,996 | 9/1985 | Saito | 346/140 R |
| 4,599,627 | 7/1986 | Vollert | 346/140 R |
| 4,682,186 | 7/1987 | Sasaki et al. | 346/140 |
| 4,709,246 | 11/1987 | Piatt et al. | 346/140 |
| 4,812,859 | 3/1989 | Chan et al. | 346/140 R |
| 4,940,998 | 7/1990 | Asakawa | 346/140 R |
| 4,963,992 | 10/1990 | Doi et al. | 358/335 |
| 4,965,593 | 10/1990 | Hickman | 346/140 R |
| 5,241,325 | 8/1993 | Nguyen | 346/140 |
| 5,250,956 | 10/1993 | Haselby et al. | 346/140 |

FOREIGN PATENT DOCUMENTS

| | | |
|---|---|---|
| 0048552 | 4/1979 | Japan . |
| 0089377 | 5/1983 | Japan . |
| 0120066 | 6/1985 | Japan ........ 346/75 |

OTHER PUBLICATIONS

Patent Abstracts of Japan, vol. 14, No. 140 (M-950) (4083) 16 Mar. 1990 & JP-A-02 006 141 (Canon, Inc.).

Primary Examiner—Benjamin R. Fuller
Assistant Examiner—N. Le

[57] ABSTRACT

A color ink jet printer including a print carriage movable along a carriage scan axis and a plurality of color producing ink jet printheads supported by the print carriage and offset relative to each other so that their nozzle arrays are non-overlapping along the media scan axis, such that the nozzle arrays of the ink jet printheads traverse non-overlapping regions as the carriage is scanned along the carriage scan axis.

8 Claims, 8 Drawing Sheets

FIG.5
FIG.6
FIG.7
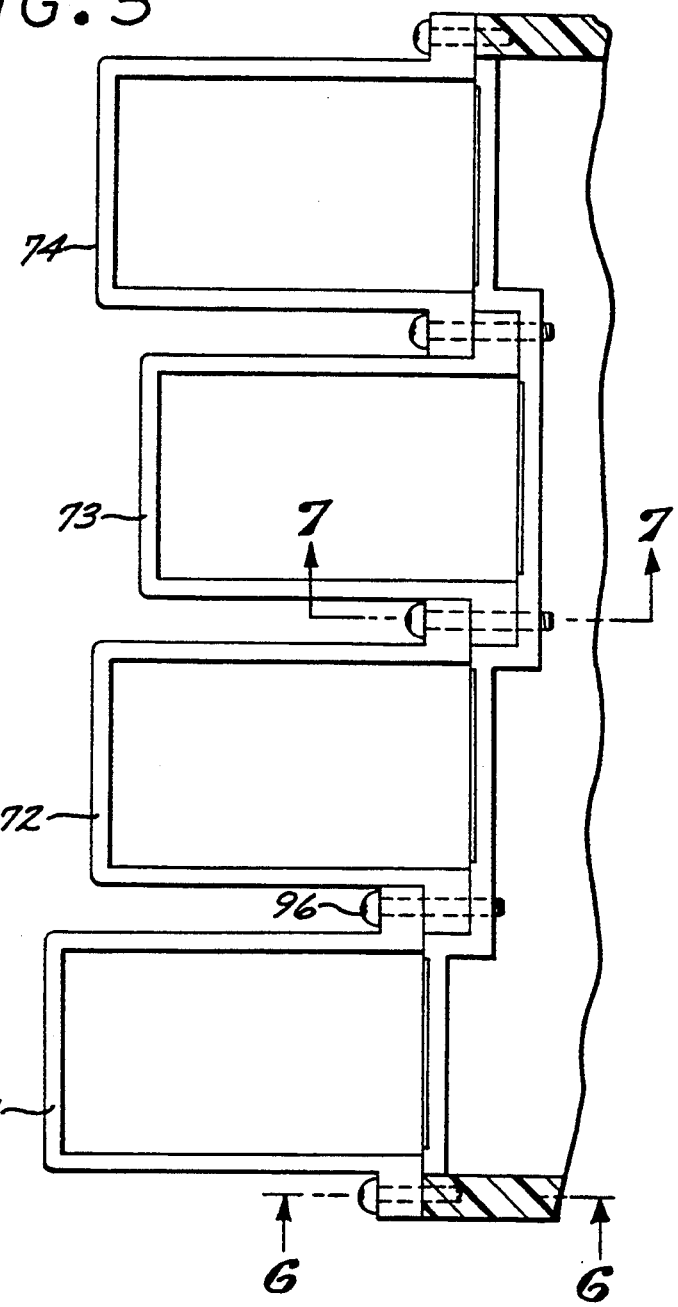
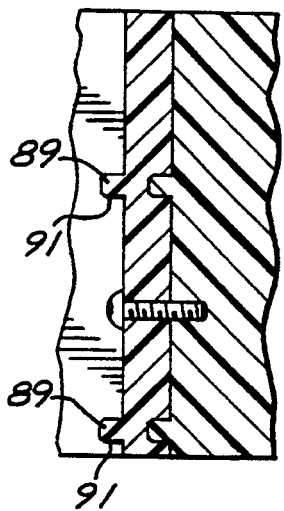
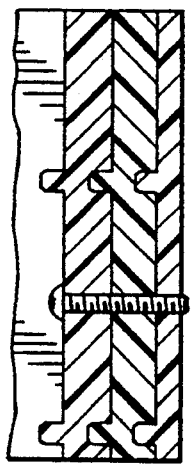

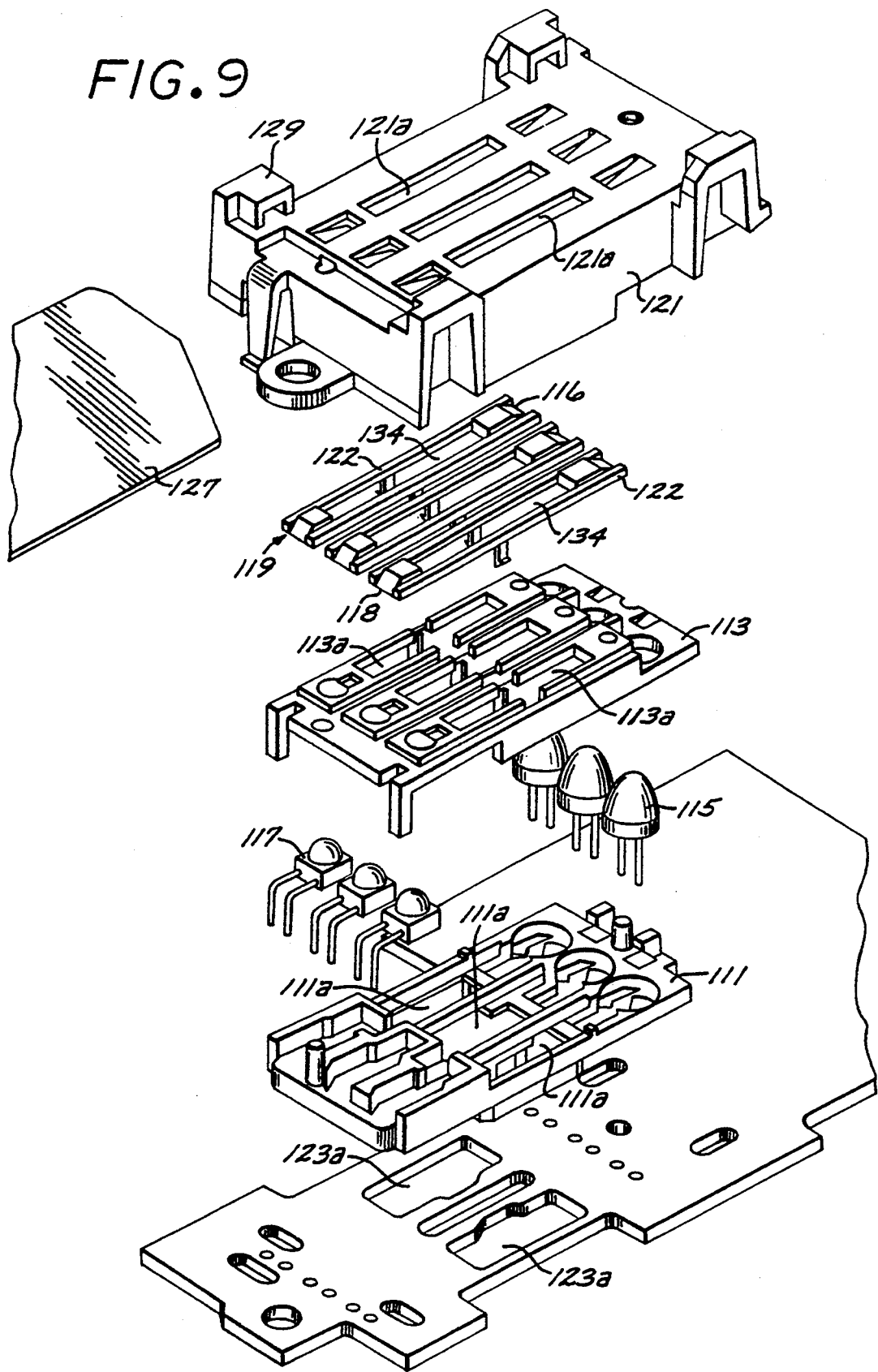

STAGGERED PENS IN COLOR THERMAL INK-JET PRINTER

This application is related to commonly assigned copending U.S. application Ser. No. 07/876,938, filed May 1, 1992 by Bauer, Majette, and Dangelo, entitled "AUTOMATIC MAINTENANCE SYSTEM FOR DROP APERTURE PLATE (OPTICS PROTECTION)," now issued as U.S. Pat. No. 5,255,009, incorporated herein by reference.

BACKGROUND OF THE INVENTION

The subject invention is generally directed to color thermal ink jet printers, and more particularly to apparatus and techniques for improving the print quality of multiple cartridge color thermal ink jet printers.

An ink jet printer forms a printed image by printing a pattern of individual dots at particular locations of an array defined for the printing medium. The locations are conveniently visualized as being small dots in a rectilinear array. The locations are sometimes "dot locations", "dot positions", or "pixels". Thus, the printing operation can be viewed as the filling of a pattern of dot locations with dots of ink.

Ink jet printers print dots by ejecting very small drops of ink onto the print medium, and typically include a movable carriage that supports one or more printheads each having ink ejecting nozzles. The carriage traverses over the surface of the print medium, and the nozzles are controlled to eject drops of ink at appropriate times pursuant to command of a microcomputer or other controller, wherein the timing of the application of the ink drops is intended to correspond to the pattern of pixels of the image being printed.

Color thermal ink jet printers commonly employ a plurality of printheads, for example four, mounted in the print carriage to produce different colors. Each printhead contains ink of a different color, with the commonly used colors being cyan, magenta, yellow, and black. These base colors are produced by depositing a drop of the required color onto a dot location, while secondary or shaded colors are formed by depositing multiple drops of different base color inks onto the same dot location, with the overprinting of two or more base colors producing secondary colors according to well established optical principles.

Print quality is one of the most important considerations of competition in the color ink jet printer field. Since the image output of a color ink jet printer is formed of thousands of individual ink drops, the quality of the image is ultimately dependent upon the quality of each ink drop and the arrangement of the ink drops on the print medium. One source of print quality degradation is insufficient drying of a first deposition ink drop prior to deposit of an overlying second ink drop. A further source of print quality degradation is the lack of precise ink drop placement on the print medium.

SUMMARY OF THE INVENTION

It would therefore be an advantage to provide a multiple printhead color ink jet printer provides for drying of ink drops prior to application of any overlying ink drops.

The foregoing and other advantages are provided by the invention in a color thermal ink jet printer that includes a print carriage movable along a carriage scan axis, a plurality of non-black color producing ink jet printheads supported by the print carriage and offset relative to each other so that their nozzle arrays are non-overlapping along the media scan axis, whereby the nozzle arrays of said non-black ink jet printheads traverse non-overlapping regions as the carriage is scanned along the carriage scan axis.

BRIEF DESCRIPTION OF THE DRAWINGS

The advantages and features of the disclosed invention will readily be appreciated by persons skilled in the art from the following detailed description when read in conjunction with the drawing wherein:

FIG. 5 is a top plan view illustrating the affixation of the printhead cartridge retaining structures to the printhead carriage staggered support walls.

FIG. 6 is a schematic elevational sectional view illustrating the affixation of the outboard flange of a printhead retaining structure that is on the outside of the group of printhead retaining structures.

FIG. 7 is a schematic elevational sectional view illustrating the affixation of overlapping flanges of adjacently mounted printhead retaining structures.

FIG. 9 is an exploded perspective view illustrating the drop detector of the assembly of FIG. 8.

DETAILED DESCRIPTION OF THE DISCLOSURE

Figure 1:
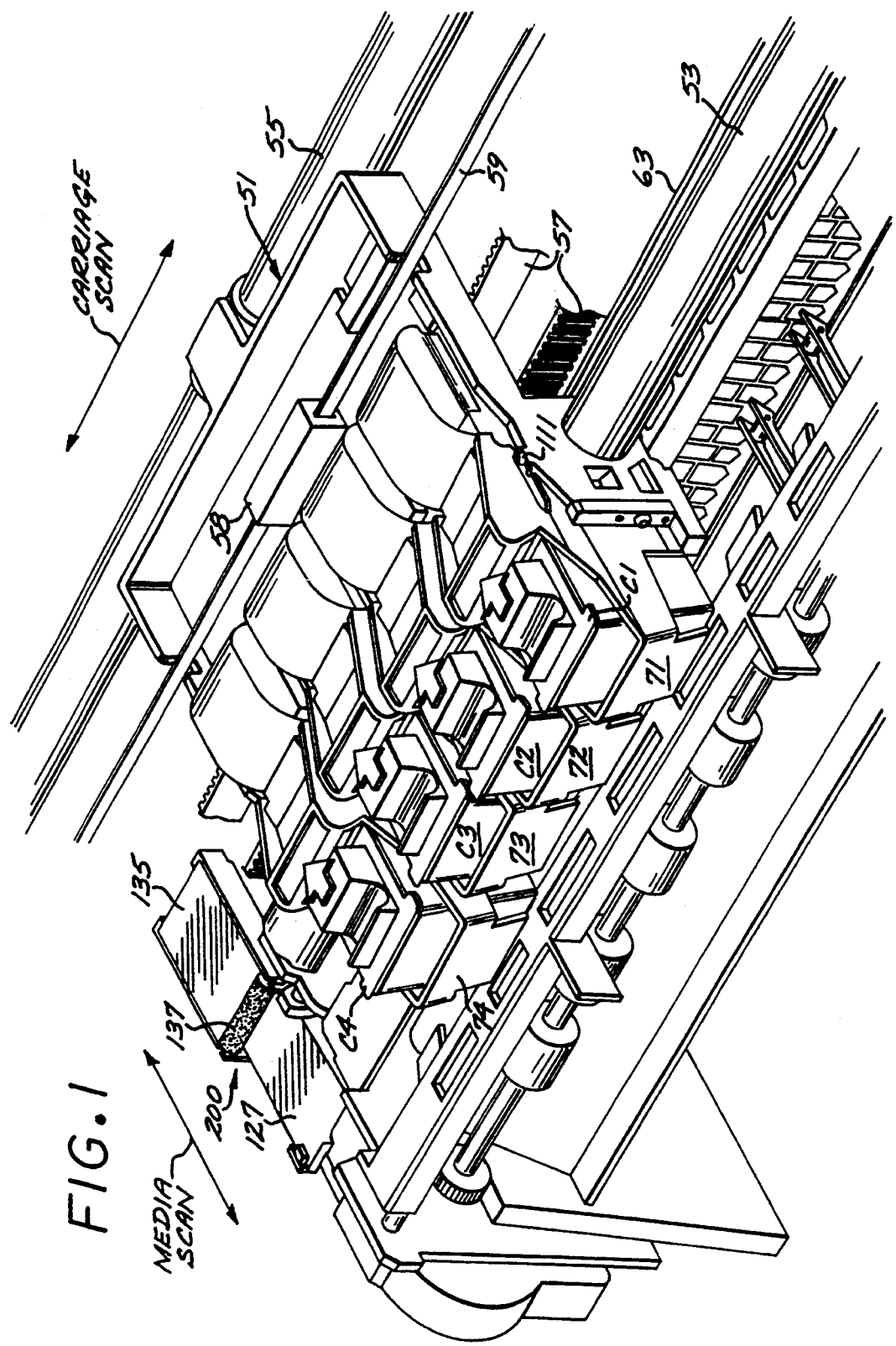
FIG. 1 is a schematic top plan view of the major mechanical components of a multiple printhead color ink jet printer in accordance with the invention.

In the following detailed description and in the several figures of the drawing, like elements are identified with like reference numerals.

The subject invention is preferably implemented in a heated printing environment such as disclosed in commonly assigned copending U.S. application Ser. No.

07/876,926, filed May 1, 1992 by Richtsmeier, Russell, Medin, Bauer, Cundiff, and Glassett, entitled "HEATER BLOWER SYSTEM IN A COLOR INK-JET PRINTER," attorney docket number 189404, incorporated herein by reference.

Figure 2:
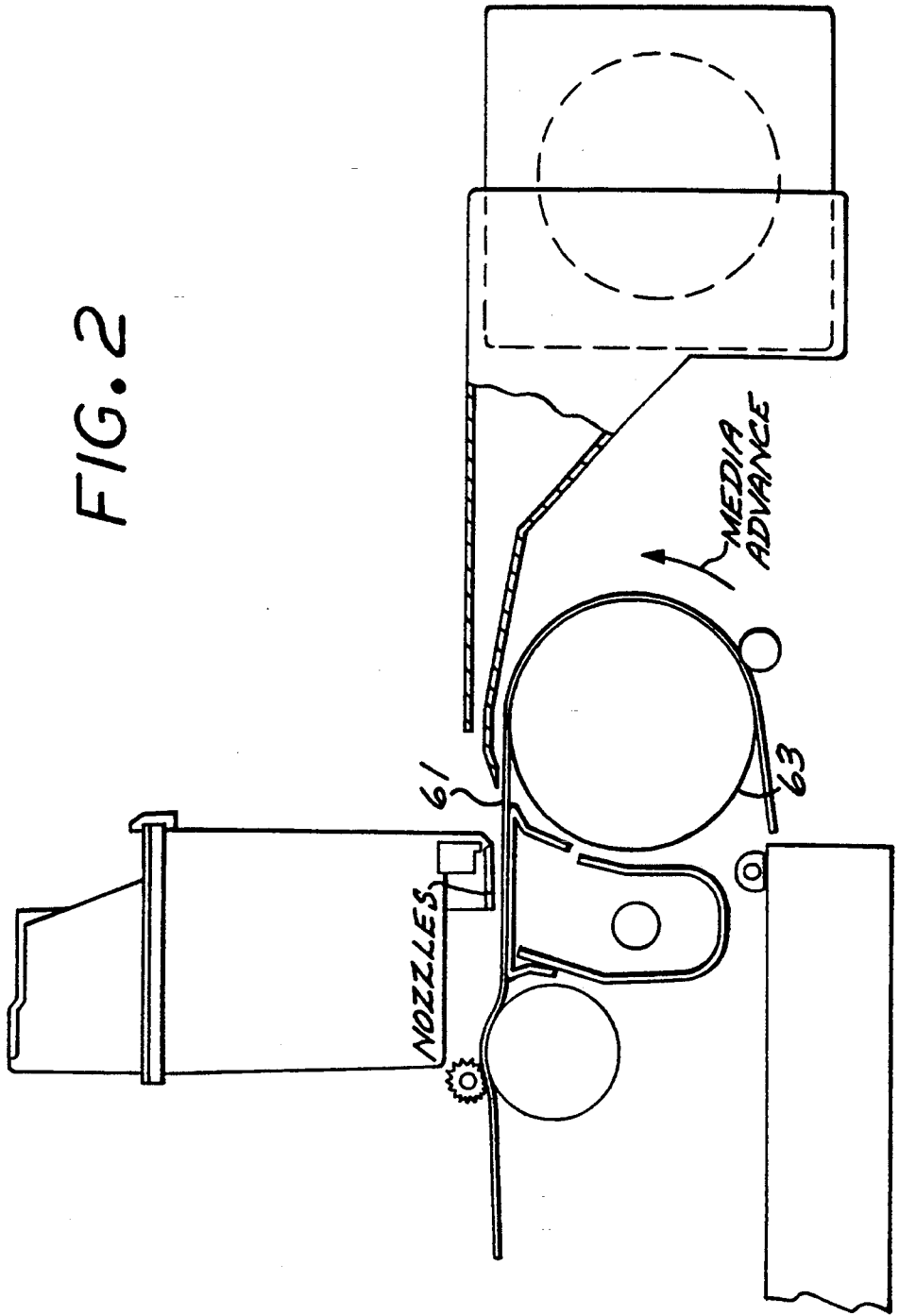
FIG. 2 is a schematic side elevational sectional view illustrating, for one of the printheads of the printer of FIG. 1, the relation between the downwardly facing ink jet nozzles and the print media of the color ink printer of FIG. 1.

Referring now to FIGS. 1 and 2, set forth therein are a schematic top plan view and a schematic side elevational sectional view illustrating, by way of illustrative example, major mechanical components of a multiple printhead color ink jet printer employing the invention. The printer includes a movable carriage 51 mounted on guide rails 53, 55 for translational movement along the carriage scan axis (commonly called the Y-axis in the printer art). The carriage 51 is driven along the guide rails 53, 55 by an endless belt 57 which can be driven in a conventional manner, and an encoder module 58 on the carriage 51 senses a linear encoder strip 59 to detect position of the carriage 51 along the carriage scan axis, for example in accordance with conventional techniques.

The carriage 51 supports four printhead cartridge retaining chutes 91 located at the front of the carriage 51 for retaining removable first through fourth ink jet printhead cartridges C1, C2, C3, C4 (sometimes called "pens," "print cartridges," or "cartridges") which are externally substantially identical. The printhead cartridges C1, C2, C3, C4 include downwardly facing nozzles for downwardly ejecting ink to a print medium 61 which lies on a support print screen 65 located below the printhead cartridges. As shown in FIG. 2 for one of the printhead cartridges, the print media 61 advances along the media scan axis from beneath a print roller 63 pursuant to rotational cooperation thereof with other appropriate rollers, for example as disclosed in the previously cited application entitled "HEATER BLOWER SYSTEM IN A COLOR INK-JET PRINTER".

The media scan axis, shown for example in FIGS. 1, 2, and 3, can be considered as being generally tangential to the print media surface that is below the nozzles of the printhead cartridges and orthogonal to the carriage scan axis. It is noted that the media scan axis is sometimes called the "vertical" axis, probably as a result of those printers having printing elements that printed on a portion of the print media that was vertical. Also, the carriage scan axis is sometimes called the "horizontal axis".

Figure 3:
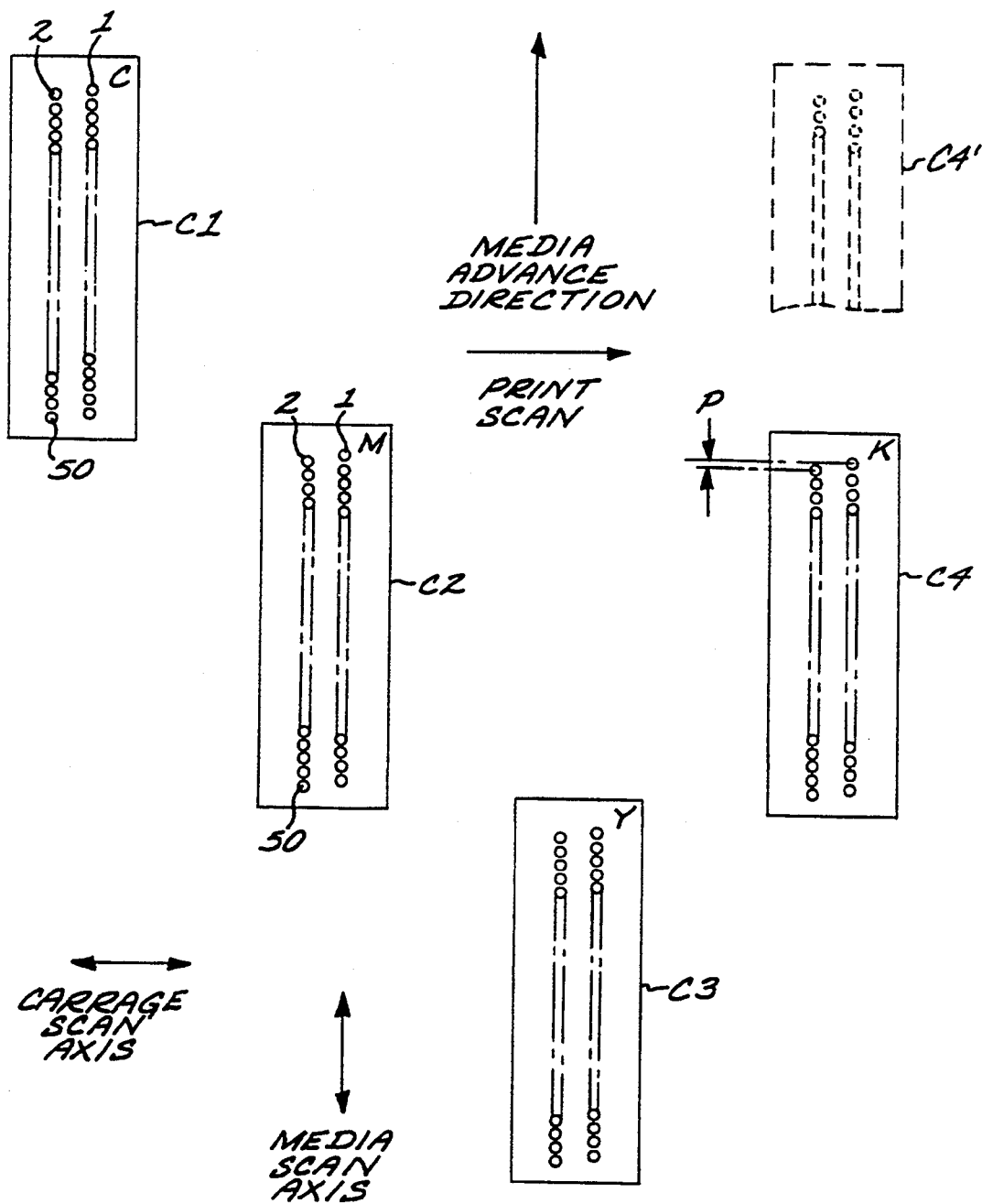
FIG. 3 is a schematic plan view illustrating the staggered arrangement of the nozzle arrays of the printhead cartridges of the printer of FIG. 1.
Figure 4:
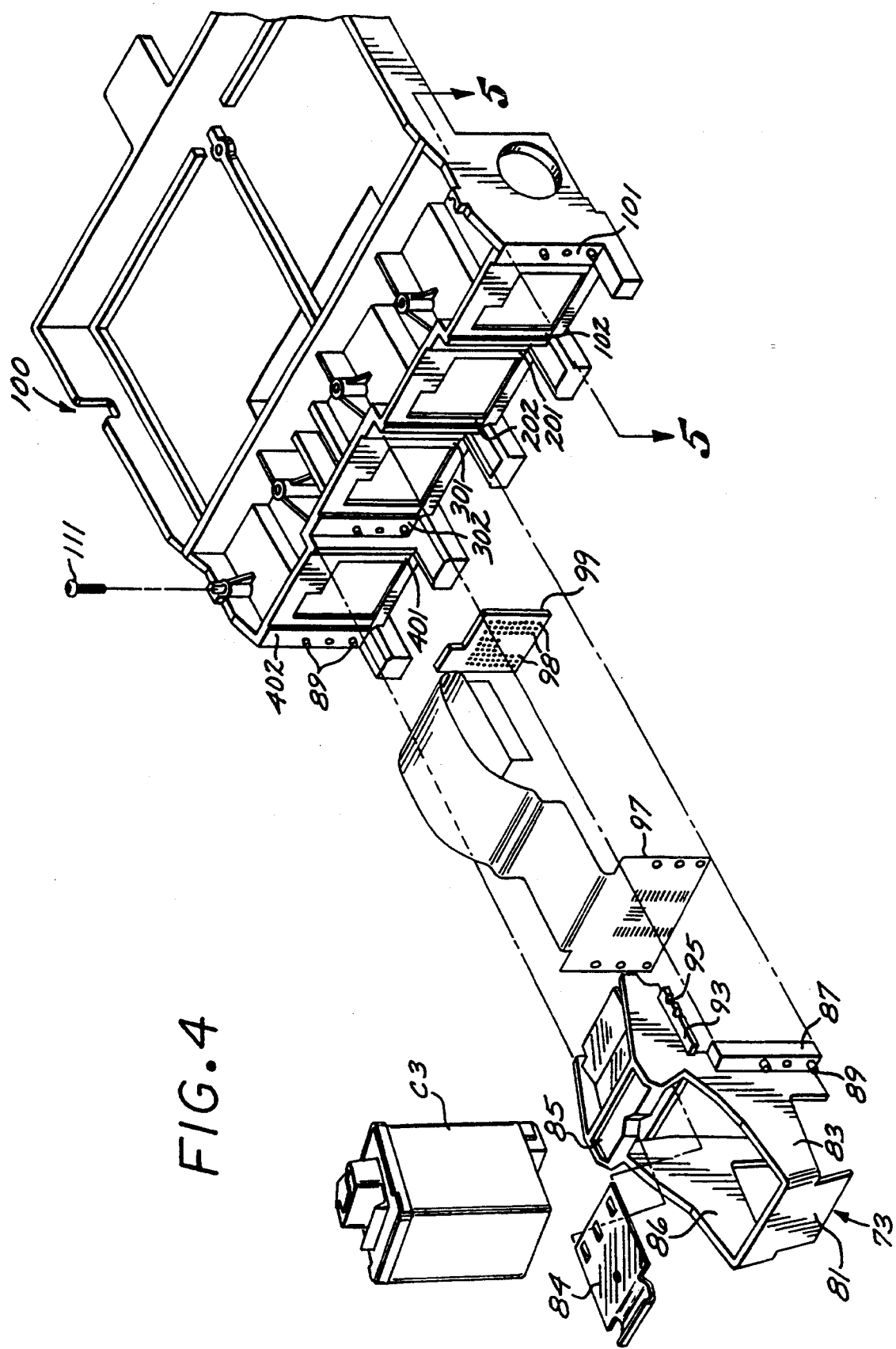
FIG. 4 is a schematic perspective view illustrating the staggered walls of the printhead carriage that support the printhead cartridge retaining structures in an arrangement that provides for a reduced head carriage width.

The cartridge chutes 71, 72, 73, 74 are sequentially positioned side by side along the carriage scan axis and each is offset relative to an immediately adjacent chute along the media scan axis such that the nozzle arrays of the cartridges C1, C2, C3 supported by the cartridge chutes 71, 72, 73 are non-overlapping along the media scan axis, and the nozzle arrays of the cartridges C2, C4 are in identical positions along the media scan axis, as more particularly shown in FIG. 3. The cartridges C1, C2, C3 comprise non-black color printing cartridges for producing the base colors of cyan, magenta, and yellow commonly utilized in color printing, while the cartridge C4 comprises a black printing cartridge. The staggered arrangement between immediately adjacent pen chutes 71, 72, 73, 74 is readily observed in the sectional top plan view of FIG. 5 which is discussed further herein relative to the structure of the cartridge chutes and their installation on the printhead carriage 51. The amount of stagger or offset along the media axis between the cartridges if discussed more specifically below in conjunction with the spacing of the nozzles of the nozzle arrays.

Referring now to FIG. 3, schematically depicted therein is the arrangement of the nozzle arrays of the cartridges C1, C2, C3, C4 as viewed from above the nozzles of the cartridges (i.e., the print media would be below the plane of the figure). Each nozzle array of the cartridges C1, C2, C3, C4 includes an even number of nozzles arranged in two columns parallel to the media scan axis, wherein the nozzle columns are staggered relative to each other. By way of illustrative example, each nozzle array includes 50 nozzles which are numbered as 1 through 50, with the 50th nozzle being at the end of the nozzle array that is first encountered by the leading edge of a print medium as it is advanced in accordance with the media advance direction shown in FIG. 3 as well as in FIG. 2, by which the leading edge of an advancing print medium first encounters the nozzle array of the printhead cartridge C3, then the nozzle arrays the printhead cartridges C2, C4, and finally the nozzle array of the printhead cartridge C1. Print direction as shown in FIG. 3 is such that the cartridge C4, the black print cartridge, is the first cartridge to encounter the print media.

The distance along the media scan axis between diagonally adjacent nozzles of each nozzle array, as indicated by the distance P in FIG. 3 for the cartridge C4, is known as the nozzle pitch, and by way of example is equal to the resolution dot pitch of the desired dot row resolution (e.g., 1/300 inch for 300 dpi). In use, the physical spacing between the columns of nozzles in a printhead cartridge is compensated by appropriate data shifts in the swath print data so that the two columns function as a single column of nozzles.

Pursuant to the non-overlapping stagger of the non-black printing cartridges C1, C2, C3 along the media axis, the areas or bands traversed by each of the cyan, magenta and yellow nozzle arrays in each carriage scan are non-overlapping. In this manner, ink drops ejected by the non-black cartridges in a given carriage scan do not fall on top of drops ejected in the same carriage scan, and ink drops of the non-black colors are in separate bands in each pass. This allows ink drops to dry before the application of any overlying or adjacent drops of a different color on a subsequent carriage scan and avoids ink bleed due to mixing of liquid ink of different colors. The black cartridge C4 does not need to be offset along the media axis relative to all of the non-black printing cartridges, since dot locations having black dots are not printed with dots of another color. However, as discussed below, the black cartridge should not be aligned with the yellow cartridge along the media axis. Stagger or offset of the cartridges along the media axis also helps to reduce cockle since ink is distributed over a larger area than if the cartridges were side by side in a line along the carriage scan axis.

The amount of offset or stagger along the media axis between nozzle arrays should be at least 2 nozzle pitches to insure sufficient separation between colors in each pass. Thus, each of the media axis offsets between C1 and C2, between C2 and C3, between C3 and C4, and between C4 and C1 should be at least 2 nozzle pitches.

It is noted that for further control of paper cockle, ink bleed, and coalescence, the staggered cartridge arrangement can be utilized in conjunction with known multiple pass print masking, as for example disclosed in commonly assigned U.S. Pat. No. 4,963,992, issued Oct. 16, 1990, to Mark S. Hickman, for "PRINTING OF PIXEL LOCATIONS BY AN INK JET PRINTER USING MULTIPLE NOZZLES FOR EACH PIXEL OR PIXEL ROW," incorporated herein by reference; and in commonly assigned U.S. Pat. No. 4,965,593, issued Oct. 23, 1990, to Mark S. Hickman, for "PRINT QUALITY OF DOT PRINTERS," incorporated herein by reference.

The black printing cartridge C4 can be aligned with the cyan or magenta cartridge, but not with the yellow cartridge, since it is desirable to separate black and yellow ink drops to avoid muddy yellow printed dots. Black and yellow are very different in brightness and any spray ink particles from the black cartridge that rewet yellow dots would cause muddy yellow dots. Thus, for the particular example wherein the cartridges C1, C2, C3 comprise cyan, magenta, and yellow producing cartridges, respectively, identified in FIG. 3 by the designations C, M, and Y, for cyan, magenta, and yellow, the black producing cartridge C4, identified in FIG. 3 by the designation K for black, can be aligned with the magenta cartridge C2 as shown in FIG. 3. It is noted that the black cartridge could be positioned in alignment with the cyan cartridge C1, as shown by a nozzle array C4' depicted in by broken lines in partial form, which would provide for even greater separation between the yellow dots and the black dots applied in each carriage scan.

Referring now to FIGS. 4-7, the cartridge chutes 71, 72, 73, 74 are substantially identical and are secured to the printhead carriage 51 in a manner that provides for a reduced printhead carriage width. As shown for the particular instance of the cartridge chute 73, each chute includes a front wall 81 and side walls 83 which are mirror images of each other. A rearwardly extending top bracket 85 is connected between the top portions of the side walls 83, and can be utilized to support a cartridge retaining leaf spring clip 84. Vertical flanges 87 extend outwardly at the rear terminal edges of the side walls 83. Each flange 87 includes forwardly extending locating pins 89 and locating apertures 91 formed on the back side of the flange in alignment with the locating pins 89. Horizontal flanges 93 extend outwardly from the lower edges of the top bracket 85, and have locating recesses 95 formed therein. The distance between the locating recesses on each flange is approximately equal to the offset between adjacent ones of the chutes 71-74. Appropriate stops are provided within each of the chutes 71-74 for cooperating with retaining leaf spring clips 84 to fixedly position respective cartridges C1 through C4.

The chutes 71-74 are secured by fasteners 95 to or against respective pairs of mounting standoffs 101, 102; 201, 202; 301, 302; 401, 402 formed in a support member 100 of the carriage 51. The standoffs of each standoff pair are coplanar and offset relative to any adjacent standoff pair by the amount of desired offset between the nozzle arrays of adjacent cartridges. The standoffs are of different widths to accommodate the overlap of the flanges of adjacent offset cartridge chutes. In particular, a wide standoff is provided for each flange that does not have an underlying flange of an adjacent chute. A narrow standoff is provided for each flange that overlaps a flange of an adjacent chute. Each wide standoff is for engagement against a flange of a chute, and therefore includes locating pins 89 for engaging corresponding locating recesses 91 of the flange. Thus, the standoffs 101, 102 for the chute 71 are wide and narrow, respectively; the standoffs 201, 202 for the chute 72 are wide and narrow, respectively; the standoffs 301, 302 for the chute 73 are both wide; and the standoffs 401, 402 for the chute 74 are narrow and wide, respectively. By offsetting the chutes 71-74 so that their mounting flanges overlap reduces the width of the carriage 51, which in turn reduces the width of the printer which must be sufficiently wide to permit over-travel of the carriage to insure the printheads cover the full width of the widest print medium for which the printer is designed to accommodate.

As shown for the representative example of the chute 73, each chute is secured against corresponding standoff pairs and any underlying flanges, with the locating recesses 91 engaged in locating pins of an underlying flange of an adjacent chute or in locating pins 89 of a wide standoff 101, 201, 301, 302, or 402. Captured between the flanges of each chute and the underlying surfaces of corresponding standoff pairs and any underlying flanges are edges of respective flexible circuits 97 having contacts engageable by corresponding interconnect contacts on the back of the printhead cartridges installed in the chutes. Resilient pads 99 are located behind the flexible circuits in recesses formed in the respective walls between each of the standoff pairs to apply pressure against the back of the flexible circuits when the cartridges are engaged in the chutes. By way of illustrative example, each resilient pad 99 includes raised bumps 98 at locations that correspond to electrical contact points between a flexible circuit 97 and a cartridge engaged therewith.

The chutes 71-74 are further secured by fasteners 113 which are positioned such that the flanges 93 of adjacent chutes can be secured with a single fastener. This can be achieved as a result of spacing the two semicircular recesses on each flange 93 by the desired offset between adjacent cartridges.

Figure 8:
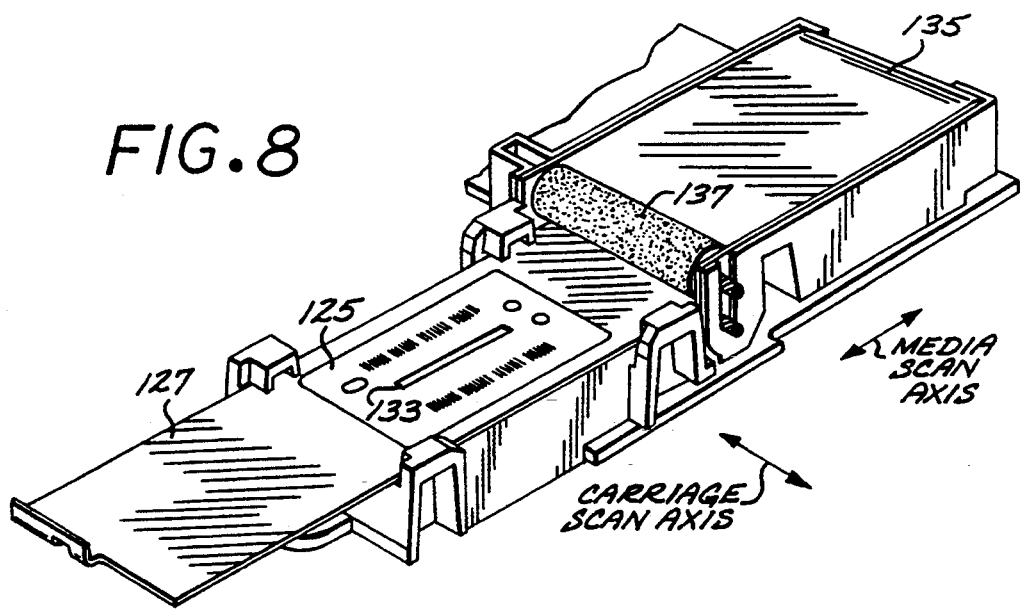
FIG. 8 is a perspective view illustrating an assembly of the printer of FIG. 1 that includes a drop detector, an aperture plate, and maintenance components for cleaning and protecting the aperture plate.

Referring now to FIG. 8, a drop detector assembly is provided for use in determining the offsets between the nozzle arrays of the printhead cartridges C1, C2, C3, C4. The assembly is conveniently located to one side of the media printing area, as shown in FIG. 1, and generally includes a drop detector 200, an overlying aperture plate 125 that is coplanar with the portion of the print medium 61 underlying the nozzle arrays of the cartridges C1, C2, C3, C4, an enclosure 135 for protectively enclosing the aperture plate 125 when not in use, and brushes 137 for cleaning the aperture plate as it is moved into the enclosure 135.

Interpen offsets are determined pursuant to detection of ink drops that pass through the aperture plate as each of the cartridges fires ink drops at the aperture plate, while scanning as well as stationarily positioned, as for example disclosed in commonly assigned U.S. Pat. Nos. 4,922,268; 4,922,270; and 5,036,340, incorporated herein by reference.

Referring now to FIG. 9, the drop detector assembly 200 includes a plurality of substantially identical elongated light bender assemblies 119 which are side by side and parallel to each other in alignment with the media scan axis. Each light bender assembly 119 includes a light bending source prism 116 and a light bending sensor prism 118 which are fixedly spaced apart from each other by elongated support members 122 connected to the sides of the prisms 116, 118 and parallel to the longitudinal axis of the light bender assembly. Each prism includes a top surface 124, an angled surface 126 at a 135 degree included angle relative to the top surface, and a bottom surface 128 beneath the angled surface 126 and parallel to the top surface 124, such that the included angle between the angled surface 126 and the bottom surface 128 is 45 degrees. Each prism further includes an inwardly facing surface 132 that is orthogonal to the longitudinal axis of the light bender assembly.

Respective upwardly facing LEDs 115 are located adjacent the bottom surfaces 128 of the source prisms 116 and respective upwardly facing photodiodes 117 are located adjacent the bottom surfaces of the sensor prisms 118.

Figure 10:
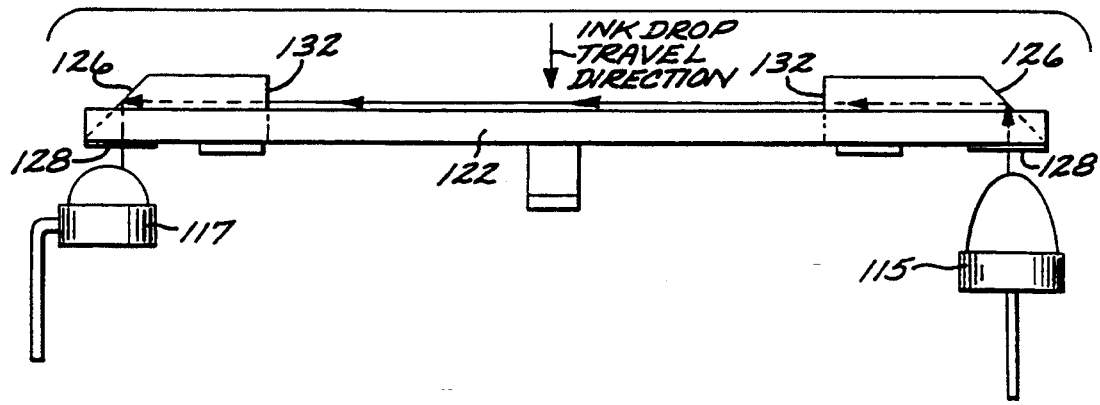
FIG. 10 is a side elevational view schematically illustrating the operation of a light bender assembly of the drop detector of FIG. 9.

As shown more particularly in FIG. 10, the source LED 115 associated with a particular light bender assembly 119 is controlled to provide source illumination that enters the bottom surface 128 of the source prism 116 and is reflected at the angled surface 126 of the source prism pursuant to internal reflection. The internally reflected illumination exits the inward facing surface 132 of the source prism 116, travels along the open region between the supports 122, and enters the inward facing surface 132 of the associated sensor prism 118. The illumination that enters the sensor prism 118 is downwardly reflected at the angled surface 126 of the sensor prism pursuant to internal reflection, and the downwardly reflected illumination exits the bottom surface 128 of the sensor prism 118 and illuminates the photodiode 117 positioned adjacent the bottom surface of the sensor prism. The region between the inwardly facing surfaces of the source and sensor prism of a light bender assembly comprises an optical detection zone 134 for detecting the presence of ink drops, wherein the presence of an ink drop in the optical detection zone 134 of a light bender assembly is detected by reduced light sensed by the photodiode 117 of the light bender assembly.

By employing internal reflection to accomplish light bending, optical coatings are avoided and the source and sensor prisms and the support members can be advantageously manufactured as an integral structure by injection molding which provides for inexpensive parts that can have complex geometries that enhance ease of assembly.

The LEDs 115 and the photodiodes 117 are contained between an lower mount 111 and an upper mount 113 which further cooperates with a top cover 121 to secure the light bender assemblies 119. The top cover 121 includes ink passage slots 121a which are respectively aligned with the respective optical detection zones of the light bender assemblies 119. Ink passage slots 111a, 113a are also formed in the lower and upper mounts 111, 113, in alignment with the optical detection zones of the light benders, wherein the slots in the lower mount 113a extending downwardly through openings 123a in a printed circuit board 123 which supports the assembly comprising the lower and upper supports, the LEDs, the photodiodes, the light benders and the top cover.

Figure 11:
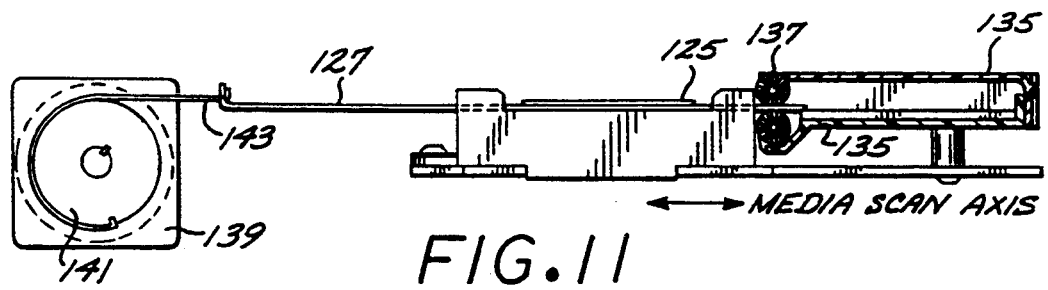
FIG. 11 is side elevational view illustrating the cleaning brushes and the aperture plate enclosure of the assembly of FIG. 8.
Figure 12:
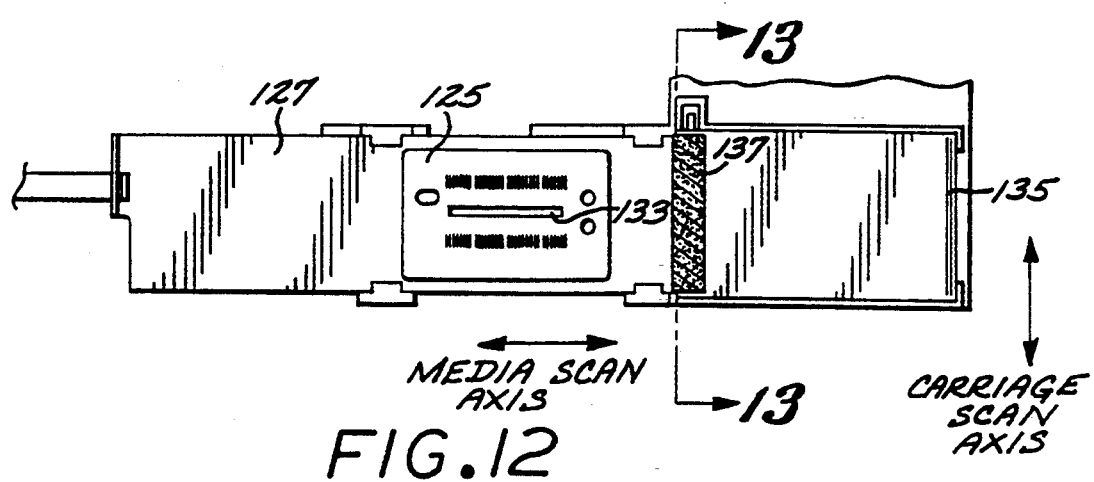
FIG. 12 is a top plan view illustrating the relation of the aperture plate and the aperture plate maintenance components of the assembly of FIG. 8.

Referring now to FIGS. 11 and 12, as well as previously referenced FIG. 8, the ink drop detector 200 is utilized with an aperture plate 125 that is supported at the rear portion of an elongated support plate 127 which is engaged in guides 129 located at the corners of the top cover 121 for sliding displacement thereon parallel to the longitudinal extent of the light bender assemblies 119. When the support plate 127 is displaced forwardly to a forward position, as shown in FIGS. 8 and 11, the aperture plate 125 overlies the drop detector 200. When the support plate 127 is displaced rearwardly to a rearward position so that the aperture plate 125 is behind the drop detector assembly 200, the forward non-apertured portion of the support plate 127 overlies the drop detector (as shown in FIG. 1) and thereby protects the optical elements of the optical detector when not in use from ink, paper dust, and other potentially contaminating materials that may become airborne inside the printer. By way of illustrative example, the support plate is displaced by a stepper motor 139 that turns a gear spool 141 which in turn pulls and pushes a drive strap 143 connected to the forward end of the support plate 127.

For protection of the aperture plate 125 from ink, paper dust and other potentially contaminating materials that might become airborne in the printer, a box like protective housing 135 is located behind and offset relative to the top cover 121 for containing the aperture plate 125 when the supporting plate 127 is displaced rearwardly into an opening in the housing that is adjacent the rear edge of the top cover 121. A pair of cylindrical brushes 137 are located at the opening of the protective housing 135, and are configured to clean ink from the openings in the aperture plate 125 as it is displaced into the protective housing 135 after being used for cartridge offset determination.

Pursuant to the arrangement of the protective housing 135, the elongated support plate 127 and the cylindrical brushes 137, the aperture plate 125 is controllably positioned over the optical detection zones of the light bender assemblies 119 when it is required for determination of the offsets between cartridges. When the aperture plate is no longer needed, it is moved between the brushes 137 and into the protective housing 135. In conjunction with the storage of the aperture plate 125 in the protection housing 135, the non-apertured front portion of the support plate 127 overlies the optical elements of the drop detector to prevent contamination thereof.

Figure 13:
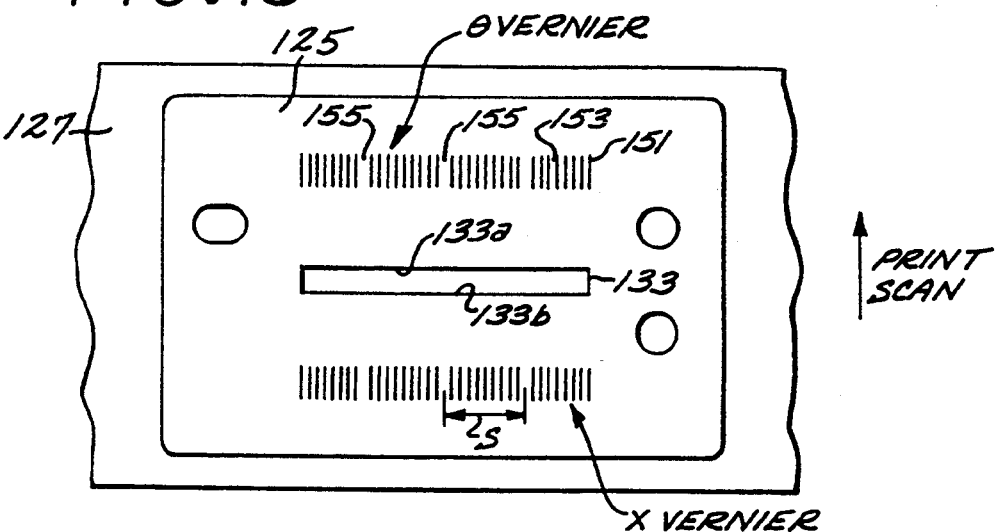
FIG. 13 is a top plan view of the aperture plate of the assembly of FIG. 8.

FIG. 13 is a detail top plan view of an example of an aperture plate 125 that includes two identical vernier aperture patterns on either side of an elongated central slot 133. The verniers and the central slot are positioned in alignment with the top cover slots 121a overlying the optical detection zones 134 of the light bender assemblies 119 when the support plate 127 is in a forward position.

After the aperture plate 125 has been utilized for determination of offsets between the cartridges C1, C2, C3, C4, it can be cleaned of ink build up by firing ink drops at the edges of the apertures in the aperture plate, and then passing the aperture plate through the cleaning brushes a number of times. By way of illustrative example, 50 drops from each nozzle of the magenta and yellow cartridges C2, C3 are applied to a first vernier. Then, 50 drops from each nozzle of the magenta and yellow cartridges are applied to both longitudinal edges of the central slot, or to only the slot edge utilized for edge detection in conjunction with offset determination. After firing of ink drops at the edge or edges of the center slot, ink drops are applied to the second vernier in the same manner as for the first vernier, or 50 drops from each nozzle of the cyan, magenta, and yellow cartridges are applied to the second vernier for the situation where more ink was applied to the second vernier in the course of offset determination. The aperture plate is then parked into the enclosure, unparked out of the enclosure, finally parked in the enclosure, for a total of 3 passes through the brushes.

Figure 14:
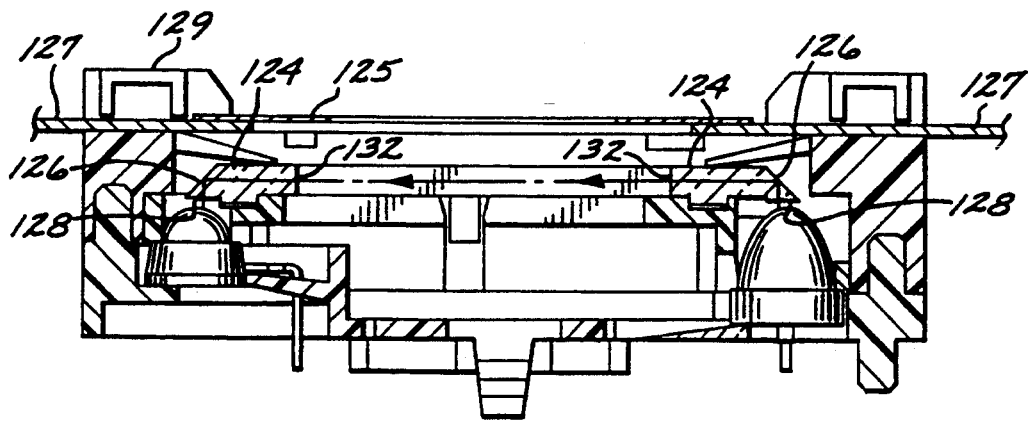
FIG. 14 is a side elevational view illustrating the location of the optical detection zones of the drop detector of FIG. 9 relative to the aperture plate utilized therewith.

As a result of the light bender assemblies and the upwardly facing LEDs and photodiodes, the optical detection zones 122 in which ink drops are detectable can be closer to the exit side of the aperture plate 125, as shown in FIG. 14, in comparison to known optical drop detectors in which an optical detection zone is formed by an LED facing an opposing photodiode. By locating the optical detection zones 122 closer to the exit side of the aperture plate 125, drop detection to be reliably performed at higher drop fire rates for the following reasons. When an ink drop leaves a nozzle, it separates in a primary drop and one or more smaller secondary drops. The velocity of the primary drop is greater than the velocities of the second drops, and the distance between the primary drop and the secondary drops increases with distance from the source nozzle. In order to avoid having a primary drop and the secondary drops of a preceding drop in the drop detection zone at the same time, drop fire rate must be sufficiently low such that a primary drop does not enter the detection zone while a secondary drop from a preceding drop is still in the detection zone. Since the distance between a primary drop and its secondary drops increases with distance from the nozzle, drop firing rate must decrease with increased distance of the detection zone from the nozzle. The capability for reliable drop detection at higher drop fire rates translates into reduced time for pen offset determination which is performed by procedures involving the firing and detection of ink drops.

Although the foregoing has been a description and illustration of specific embodiments of the invention, various modifications and changes thereto can be made by persons skilled in the art without departing from the scope and spirit of the invention as defined by the following claims.

What is claimed is:

1. A color ink jet printer comprising:
a print carriage movable along a carriage scan axis;
means for moving said print carriage along the carriage scan axis;
means for moving print media along a media scan axis that is substantially orthogonal to said carriage scan axis; and
a plurality of non-black producing ink jet printheads supported by said print carriage in side-by-side sequential locations along the carriage scan axis and having respective nozzle arrays for providing respectively different non-black color outputs, each of said nozzle arrays having a plurality of nozzles for printing dots at a same predetermined print resolution for each of the non-black color producing ink jet printheads, said non-black ink jet printheads being offset relative to each other by at least 2 units of said print resolution along the media scan axis so that their respective nozzle arrays are spaced apart and non-overlapping along the media scan axis;
whereby the nozzle arrays of said non-black ink jet printheads traverse spaced apart non-overlapping print regions as said carriage is scanned along the carriage scan axis.

2. A color ink jet printer comprising:
a print carriage movable along a carriage scan axis;
means for moving said print carriage along the carriage scan axis;
means for moving print media along a media scan axis that is substantially orthogonal to said carriage scan axis;
a plurality of non-black producing ink jet printheads supported by said print carriage and having respective nozzle arrays for providing respectively different non-black color outputs, each of said nozzle arrays having a plurality of nozzles for print dots at a same predetermined print resolution for each of the non-black color producing ink jet printheads, said non-black ink jet printheads being offset relative to each other by at least 2 units of said print resolution along the media scan axis so that their respective nozzle arrays are spaced apart and non-overlapping along the media scan axis; and
wherein said ink jet printheads comprise substantially identical ink jet cartridges, and wherein said carriage includes respective support means for removably supporting each of said ink jet cartridges, said respective support means being substantially identical to each other and arranged side by side along the carriage scan axis and offset relative to each other in accordance with the offset of the respective non-black ink jet printhead;
whereby the nozzle arrays of said non-black ink jet printheads traverse non-overlapping print regions as said carriage is scanned along the carriage scan axis.

3. The ink jet printer of claim 2 wherein said carriage has a width along the carriage scan axis, wherein each of said support means includes three walls and mounting flanges oriented orthogonally to an associated nozzle array, and wherein flanges of adjacent support means overlap so as to reduce the width of the carriage along the carriage scan axis.

4. A color ink jet printer comprising:
a print carriage movable along a carriage scan axis;
means for moving said print carriage along the carriage scan axis;
means for moving print media along a media scan axis that is substantially orthogonal to said carriage scan axis;
a plurality of non-black producing ink jet printheads supported by said print carriage and having respective nozzle arrays for providing respectively different non-black color outputs, each of said nozzle arrays having a plurality of nozzles for print dots at a same predetermined print resolution for each of the non-black color producing ink jet printheads, said non-black ink jet printheads being offset relative to each other by at least 2 units of said print resolution along the media scan axis so that their respective nozzle arrays are spaced apart and non-overlapping along the media scan axis; and
a black color producing ink jet printhead supported by said print carriage and providing a black color output, said black ink jet printhead having a nozzle array in a given position along the carriage scan axis aligned with one of the nozzle arrays of said non-black ink jet printheads;
whereby the nozzle arrays of said non-black ink jet printheads traverse spaced apart non-overlapping print regions as said carriage is scanned along the carriage scan axis.

5. The color ink jet printer of claim 4 wherein said non-black ink jet printheads comprise a cyan ink jet printhead, a magenta ink jet printhead, and a yellow ink jet printhead, and wherein said black ink jet printhead is aligned with the magenta printhead such that their nozzle arrays are in said same given position along the media scan axis.

6. The color ink jet printer of claim 4 wherein said non-black ink jet printheads comprise a cyan ink jet printhead, a magenta ink jet printhead, and a yellow ink jet printhead, and wherein said black ink jet printhead is aligned with the cyan printhead such that their nozzle arrays are in said same given position along the media scan axis.

7. The ink jet printer of claim 4 wherein said ink jet printheads comprise substantially identical ink jet cartridges, and wherein said carriage includes respective support means for removably supporting each of said ink jet cartridges, said respective support means being substantially identical to each other and arranged side by side along the carriage scan axis and offset relative to each other in accordance with the offset of the respective nozzle arrays.

8. The ink jet printer of claim 7 wherein said carriage has a width along the carriage scan axis, wherein each of said support means includes three walls and mounting flanges oriented orthogonally to the associated nozzle array, and wherein flanges of adjacent support means overlap so as to reduce the width of the carriage along the carriage scan axis.

* * * * *